Feb. 10, 1953  G. A. LYON  2,628,123
TOP SHIELD FOR AUTOMOBILES
Filed Dec. 22, 1948
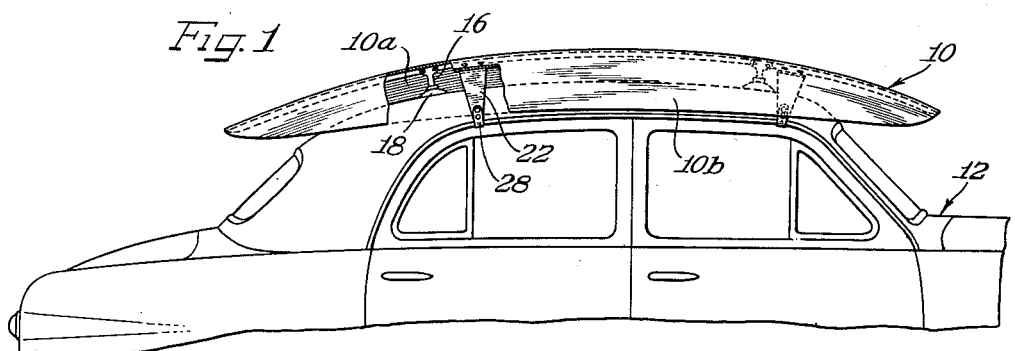
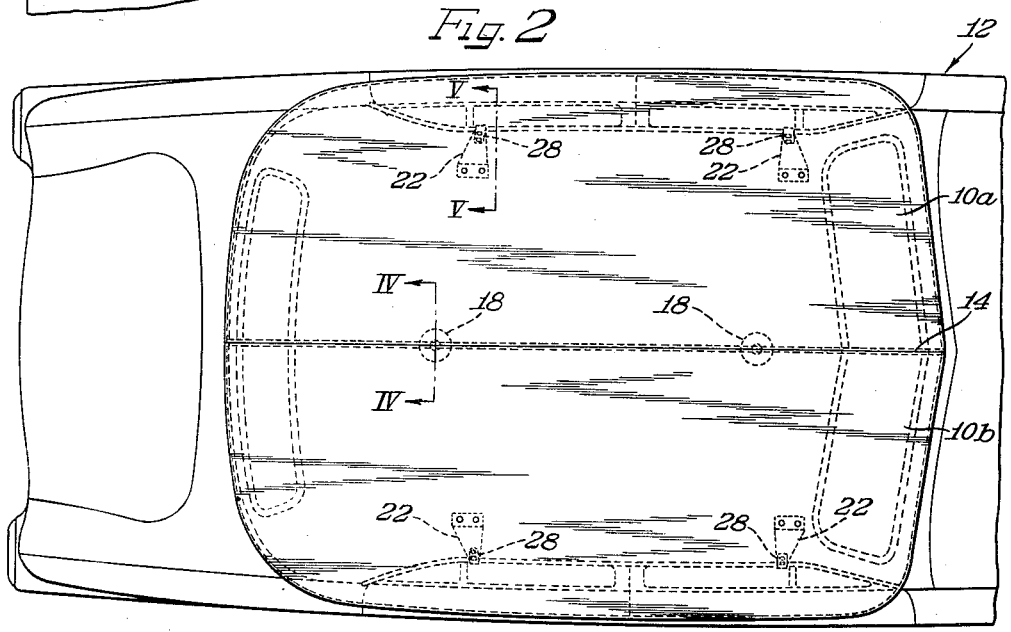
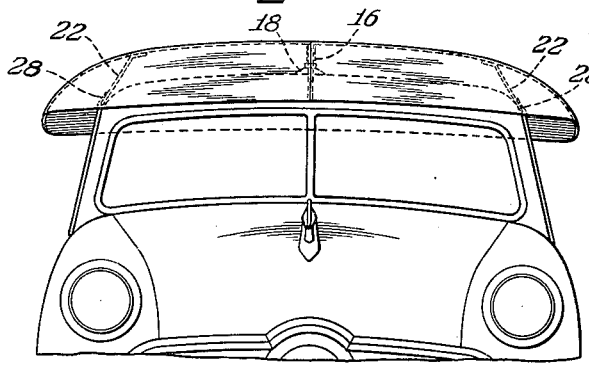
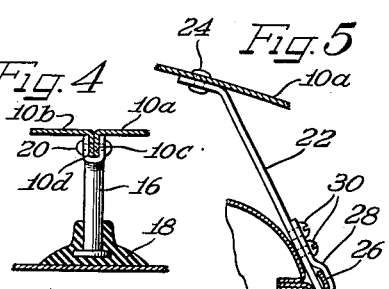
Inventor
George Albert Lyon
by The Firm of Charles W. Hill
Attys Patented Feb. 10, 1953

2,628,123

UNITED STATES PATENT OFFICE 2,628,123

TOP SHIELD FOR AUTOMOBILES

George Albert Lyon, Detroit, Mich.

Application December 22, 1948, Serial No. 66,765

4 Claims. (Cl. 296—95)

This invention relates to a shield which may be readily mounted on the top of an automobile, truck, boat or the like and which has particular utility in reflecting heat away from the vehicle top and for cooling the top of the vehicle.

Nearly everyone, at one time or another, has experienced discomfort due to heat while riding in an automobile. The amount of discomfort of course, varies with the degree of heat encountered. The degree of heat is dependent upon many factors among which are the brilliance of the sunlight, the climate, atmospheric conditions, etc. One of the greatest factors causing heat discomfort is the absorption of the sun rays by the top of the metal automobile body. Most automobiles are not painted with colors having particularly efficient heat reflection characteristics.

Accordingly, it is an object of this invention to provide a shield for the tops of vehicles which will diminish to a great extent passenger discomfort due to heat from the sun's rays striking an automobile.

Another object of this invention is to provide a top shield for an automobile or the like which may readily be disassembled for storage.

Another object of this invention is to provide a shield for automobile tops which may be readily mounted and secured to an automobile top.

A further object of this invention is to provide a shield for the top of vehicles which, when mounted upon a vehicle, will provide a visor for all of the windows of the vehicle.

Another object of this invention is to provide a top shield for automobiles which is inexpensive in high speed production manufacturing processes.

In accordance with the general features of this invention, there is provided a canopy type shield of shell-like construction, which may be readily manufactured of light weight sheet metal, such as aluminum, or from sheet plastic or the like by the use of forming or drawing dies.

Another feature of this invention relates to the assembly of the portions of the shields, wherein the clamping of the flanged edges of the portions form a reinforcing rib for the complete shell-like shield or canopy.

Another feature of the invention relates to the securing of the assembled shield to the automobile by the use of suction cups based along the joinder seam or reinforcing rib of the shield and by the use of mounting brackets which may be secured to the rain gutter which runs about the automobile door frames. In view of the foregoing, it is obvious that the shield or canopy can be secured to the automobile without causing any modifications to the automobile body such as permanently mounted brackets, etc.

Still another feature of the invention relates to the forming of the shield or canopy portions so that when they are united to form a complete shield, the outer periphery of the shield will extend sufficiently beyond the outer perimeter portions of the top so as to provide a sun visor for the windshields, side windows and rear window of the automobile. The extension also provides a rain shelter for those portions of the automobile.

Yet another feature of the invention relates to the mounting of the shield by means of the aforementioned suction cups and brackets so as to provide a considerable air space between the automobile top and the shield which substantially conforms to the contours of the auto top thereby permitting air to circulate between the shield and the automobile top providing further inherent cooling for the auto top.

Other objects and features of this invention will more fully appear from the following detailed description taken in conjunction with the accompanying drawings which illustrate one embodiment thereof and in which:

Figure 1 is a fragmentary side view of an automobile upon which a top shield embracing the features of this invention is mounted, the shield being in partial cross section to more clearly illustrate the mounting media;

Figure 2 is a fragmentary top view of the automobile of Figure 1, showing a top plan view of a top shield which embraces the features of this invention;

Figure 3 is a front view of the automobile and attached shield.

Figure 4 is a fragmentary, cross-sectional view taken substantially on the line IV—IV of Figure 2 looking in the direction of the arrows, which shows one of the tube mounting posts in elevation and its cooperating suction cup in cross section; and Figure 5 is a fragmentary, cross-sectional view taken substantially on the line V—V of Figure 2 looking in the direction of the arrows, showing one of the top shield mounting brackets or gutter brackets.

As shown on the drawings:

It is believed that the novel method of cooling a vehicle will be best and fully understood from the following description of an apparatus for practicing the same, the particular embodiment described and illustrated in the drawings being one where the shield is mounted on an automobile.

The reference numeral 10 designates generally a shield assembly constructed in accordance with this invention. In the various figures of the drawings the shield 10 is shown mounted or secured to an automobile 12.

The shield 10 is of shell-like configuration comprising two halves 10a and 10b which are formed of plastic or the like to substantially follow the contours of the automobile top and which are joined in assembly and mounting to form a seam 14. The joining edges of the portions 10a and 10b are flanged at 10c and 10d, respectively, for joinder. The flanged portions 10c and 10d are abutted and secured by a plurality of T-shaped posts 16 which are embedded at their lower ends in suction cups 18.

The upper portion of the T-posts 16 is of U-shaped cross section wherein the flanged portions 10c and 10d may be secured as by the rivets 20 (Figure 4). The flanged portions 10c and 10d when thus secured form a reinforcing rib for the shield 10. The suction cup 18 and the posts 16 are placed along the centerline of the top of the automobile 12 thus securing the shield 10 in spaced relationship with respect to the automobile top, having the concave portion of the shield 10 facing downwardly to substantially conform with the outline of the automobile top.

By placing the suction cups 18 along the centerline of the automobile top it secures the shield 10 in centered position on the automobile 12 so that the outer periphery of the shield 10 extends well beyond the outer periphery of the automobile top so that the shield 10 will provide a sun visor for the front, rear and side windows of the car 12 as well as a rain reflector or shield therefor.

A plurality of substantially L-shaped straps 22 are secured to the underside of the shield 10 at distances remote from the centerline of the shield 10 and approaching the sides of the portions 10a and 10b. The short leg of the strap 22 is secured as by rivets 24 to the shield 10 and the longer side of the L extends outwardly and downwardly from the shield 10, the lower extremity of the leg residing within the rain gutter 26 of the automobile 12. A hook-shaped clamp 28 fits about the gutter 26 with the straight portion of the hook 28 being adjacent the long leg of the strap 22 and being secured to the strap 22 as by screws 30.

The shield 10 is now completely assembled on the top of the car 12 and is rigidly secured by means of the posts 16 and the straps 22. The shield 10 being secured in uniformly spaced relationship with respect to the top of the car will permit the passage of air between the underside of the shield 10 and the top of the car, the rate of air passage increasing with the speed of the automobile.

It is well known that when air passes over a surface at a high rate a low pressure area and cooling area is attained adjacent the surface. The top of the shield 10 is painted white to attain the greatest light and heat reflecting characteristics thus minimizing heat absorption.

From the foregoing it may be seen that by positioning the shield on a vehicle, the heat reflecting, the sun visoring and air passaging characteristics of the apparatus will greatly reduce the heat encountered within the automobile thus adding greatly to the comfort of automobile passengers.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A shield which may be detachably secured to the top wall of an automobile body having rain gutters, said shield comprising a plurality of sections of sheet material of shell-like configuration having highly reflecting outer surfaces and being dimensioned to extend beyond the outer confines of the automobile body when joined edgewise, each of said sections having a flanged edge and the flanged edges of the sections being in side-by-side relation, a plurality of bifurcated posts spaced along the line of joinder of said flanged edges and with the flanges of the edges within the bifurcations of said posts, means securing said flanged edges in said bifurcations and the flanged edges thereby providing a reinforcing rib for said shield, a plurality of substantially rigid elongated members secured to the under side of said shield at points inwardly spaced from the marginal edges of the shield, the lower portions of said elongated members arranged to be disposed within the rain gutters of the top wall of the automobile, and means for securing said members within the gutter whereby said members and said posts maintain said shield in spaced relation to the top of the automobile.

2. A shield which may be detachably secured to the top wall of an automobile body, said shield comprising a plurality of sheet material sections of shell-like configuration having highly reflecting outer surfaces, each of said sections having a flanged edge, said flanged edges of the sections being joined together, and a plurality of bifurcated posts spaced along said line of joinder of said flanges, the bifurcated portions of said posts being constructed and arranged to engage said flanged edges therein so that the flanged edges provide a reinforcing rib for said shield.

3. An automobile top shield structure for disposition in spaced relation to the top wall of an automobile, said shield being of shell-like configuration and having a depending reinforcing rib, and a post member for supporting the shield on said top wall and having a bifurcated upper end portion engaging and secured to said rib for supporting said shield in said spaced relation.

4. A shield member which may be detachably secured to the top wall of a vehicle body having rain gutters, said shield comprising a plurality of sections of shell-like configuration having highly reflecting outer surfaces, each of said sections having a downturned flanged edge for joinder with another, means for clamping said flanged edges to one another thereby providing a reinforcing rib for said shield, said means comprising a plurality of bifurcated posts spaced along and gripping said reinforcing rib so as to maintain the superimposed portion of said shield in spaced relation to said top wall, a suction cup at the bottom of each of said posts to secure said posts to said top wall, a plurality of substantially rigid straps secured in depending relation to the under side of said shield spaced from the lateral marginal portion thereof and having their lower ends arranged for disposition within the gutter of said top wall, and clamping means for securing said straps within said gutter.

GEORGE ALBERT LYON.

REFERENCES CITED

The following references are of record in the file of this patent:

UNITED STATES PATENTS

| Number | Name | Date |
|---|---|---|
| 432,272 | Harvey | July 15, 1890 |
| 466,624 | Pennock | Jan. 5, 1892 |
| 1,486,424 | Ferno | Mar. 11, 1924 |
| 1,530,540 | Bouffier | Mar. 24, 1925 |
| 1,733,007 | Dahl | Oct. 22, 1929 |
| 2,231,293 | Norman | Feb. 11, 1941 |
| 2,357,203 | Jimmes | Aug. 29, 1944 |